United States Patent
Chen et al.

(10) Patent No.: US 12,547,686 B2
(45) Date of Patent: Feb. 10, 2026

(54) MOBILE DEVICE SECRET PROTECTION SYSTEM AND METHOD

(71) Applicant: Visa International Service Association, San Francisco, CA (US)

(72) Inventors: Yuexi Chen, Foster City, CA (US); Marc Kekicheff, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 84 days.

(21) Appl. No.: 18/592,030

(22) Filed: Feb. 29, 2024

(65) Prior Publication Data

US 2025/0077633 A1    Mar. 6, 2025

Related U.S. Application Data

(63) Continuation of application No. 18/263,976, filed as application No. PCT/US2021/016770 on Feb. 5, 2021, now Pat. No. 11,960,581.

(51) Int. Cl.
| | |
|---|---|
| G06F 21/31 | (2013.01) |
| H04L 9/30 | (2006.01) |
| H04L 9/32 | (2006.01) |

(52) U.S. Cl.
CPC ........... *G06F 21/31* (2013.01); *H04L 9/30* (2013.01); *H04L 9/3268* (2013.01)

(58) Field of Classification Search
CPC ..................................................... G06F 21/31
See application file for complete search history.

(56) References Cited

U.S. PATENT DOCUMENTS

| | | |
|---|---|---|
| 9,251,513 B2 | 2/2016 | Nilsson et al. |
| 9,800,562 B2 | 10/2017 | Lalwani et al. |
| 10,395,230 B1 * | 8/2019 | Benkreira ........... G06F 3/04886 |

(Continued)

FOREIGN PATENT DOCUMENTS

| | | |
|---|---|---|
| KR | 101879758 B1 | 8/2018 |
| KR | 20200002985 A | 1/2020 |

OTHER PUBLICATIONS

"EMV Integrated Circuit Card Specifications for Payment Systems", EMVCo, LLC, Book 2, V 4.1, May 2004, 187 pages.

(Continued)

*Primary Examiner* — Bradley W Holder
(74) *Attorney, Agent, or Firm* — Kilpatrick Townsend & Stockton LLP

(57) ABSTRACT

An access device is disclosed. The access device includes a non-transitory computer readable medium that includes code for performing a method that includes receiving, from a user device, a digital certificate and a seed, and then encrypting the seed, and a first access device key with a public key from the digital certificate to form encrypted data. The method also includes transmitting, to the user device, the encrypted data. The user device decrypts the encrypted data using a private key corresponding to the public key to obtain the seed, and the first access device key, verifies that the seed received from the access device matches the seed sent to the access device, and encrypts a secret or derivative thereof with the first access device key to form an encrypted secret or derivative thereof. The method also includes receiving the encrypted secret or derivative thereof.

20 Claims, 6 Drawing Sheets

(56) References Cited

U.S. PATENT DOCUMENTS

| | | | |
|---|---|---|---|
| 10,609,070 B1* | 3/2020 | Farmer, III | H04L 63/126 |
| 2013/0191885 A1* | 7/2013 | Hubner | H04L 41/5061 |
| | | | 709/217 |
| 2017/0195298 A1 | 7/2017 | Brand | |
| 2019/0052613 A1 | 2/2019 | Karlsen et al. | |
| 2019/0066425 A1* | 2/2019 | Davis | G07C 9/00309 |
| 2020/0186505 A1 | 6/2020 | Amar et al. | |

OTHER PUBLICATIONS

"EMV Integrated Circuit Card Specifications for Payment Systems", EMVCO LLC, Book 3-Application Specification, Version 4.3, Nov. 2011, 230 pages.
U.S. Appl. No. 18/263,976 , "Notice of Allowance", Nov. 29, 2023, 15 pages.
PCT/US2021/016770 , "International Preliminary Report on Patentability", Aug. 17, 2023, 6 pages.
PCT/US2021/016770 , "International Search Report and the Written Opinion", Oct. 25, 2021, 9 pages.
Application No. 201925042.0, "EP Extended Search Report", Feb. 20, 2024, 9 pages.
Stallings William, "Confidentiality Using Conventional Encryption," Chapter 5, XP-002973153, Jan. 1, 1999, 91 pages.
Abughazalah et al., "Secure Mobile Payment on NFC-Enabled Mobile Phones Formally Analysed Using CasperFDR", 2014, IEEE 13$^{th}$ International Conference on Trust, Security and Privacy in Computing and Communications.

* cited by examiner

MOBILE DEVICE SECRET PROTECTION SYSTEM AND METHOD

CROSS-REFERENCES TO RELATED APPLICATIONS

This application is a continuation application of U.S. patent application Ser. No. 18/263,976, filed on Aug. 2, 2023, which is a National Stage of International Application No. PCT/US2021/016770, filed Feb. 5, 2021, the entirety of all of which are incorporated by reference herein.

BACKGROUND

Many users prefer using contactless devices to obtain access to certain resources (e.g., access to a location, access to a resource such as a good or service, etc.) to reduce the risk of contracting pathogens such as COVID-19. However, in some interactions, a user conducting an interaction may need to provide a secret to an access device before the user is allowed to access the desired resource. For example, a user may need to enter a secret into a display or keypad of an access terminal before the user is allowed to access a secure location or a resource such as a good. This exposes the user to a risk of possible infection, since the access terminal may contain the pathogen.

Having a user enter a secret into an access device also introduces security issues. For example, some access devices are not secure, and secrets can be stolen from access devices by hackers and other unauthorized persons. Further, in some cases, after a user enters a secret into an access device via a keypad of the access device, the heat produced by the user's fingers can remain on the keys of the keypad. Some have used infrared devices to determine the keys that were pressed by the person and determine the user's secret. As such, entry of secrets into access devices can be problematic.

Embodiments of the invention address these and other problems individually.

BRIEF SUMMARY

One embodiment of the invention includes a method. The method comprises: transmitting, by a user device to an access device, a digital certificate and a seed, wherein the access device encrypts the seed, and a first access device key with a public key from the digital certificate to form encrypted data; receiving, by the user device from the access device, the encrypted data; decrypting, by the user device, the encrypted data using a private key corresponding to the public key to obtain the seed, and the first access device key; verifying, by the user device, that the seed received from the access device matches the seed sent to the access device; encrypting, by the user device, a secret or derivative thereof with the first access device key to form an encrypted secret or derivative thereof; and transmitting, by the user device to the access device, the encrypted secret or derivative thereof Another embodiment of the invention includes a user device comprising: a processor; and a non-transitory computer readable medium. The non-transitory computer readable medium comprises, instructions, executable by the processor to cause the access device to: transmit, to an access device, a digital certificate and a seed, wherein the access device encrypts the seed, and a first access device key with a public key from the digital certificate to form encrypted data; receive, rom the access device, the encrypted data; decrypt the encrypted data using a private key corresponding to the public key to obtain the seed, and the first access device key; verify that the seed received from the access device matches the seed sent to the access device; encrypt a secret or derivative thereof with the first access device key to form an encrypted secret or derivative thereof; and transmit to the access device, the encrypted secret or derivative thereof.

Another embodiment is directed to an access device comprising: a processor; and a non-transitory computer readable medium, the non-transitory computer readable medium comprising code, executable by the processor, for performing a method comprising: receiving, from a user device, a digital certificate and a seed; encrypting the seed, and a first access device key with a public key from the digital certificate to form encrypted data; transmitting, to the user device, the encrypted data, wherein the user device decrypts the encrypted data using a private key corresponding to the public key to obtain the seed, and the first access device key, verifies that the seed received from the access device matches the seed sent to the access device, and encrypts a secret or derivative thereof with the first access device key to form an encrypted secret or derivative thereof; and receiving, from the user device, the encrypted secret or derivative thereof These and other embodiments are described in further detail below.

DETAILED DESCRIPTION

Figure 1:
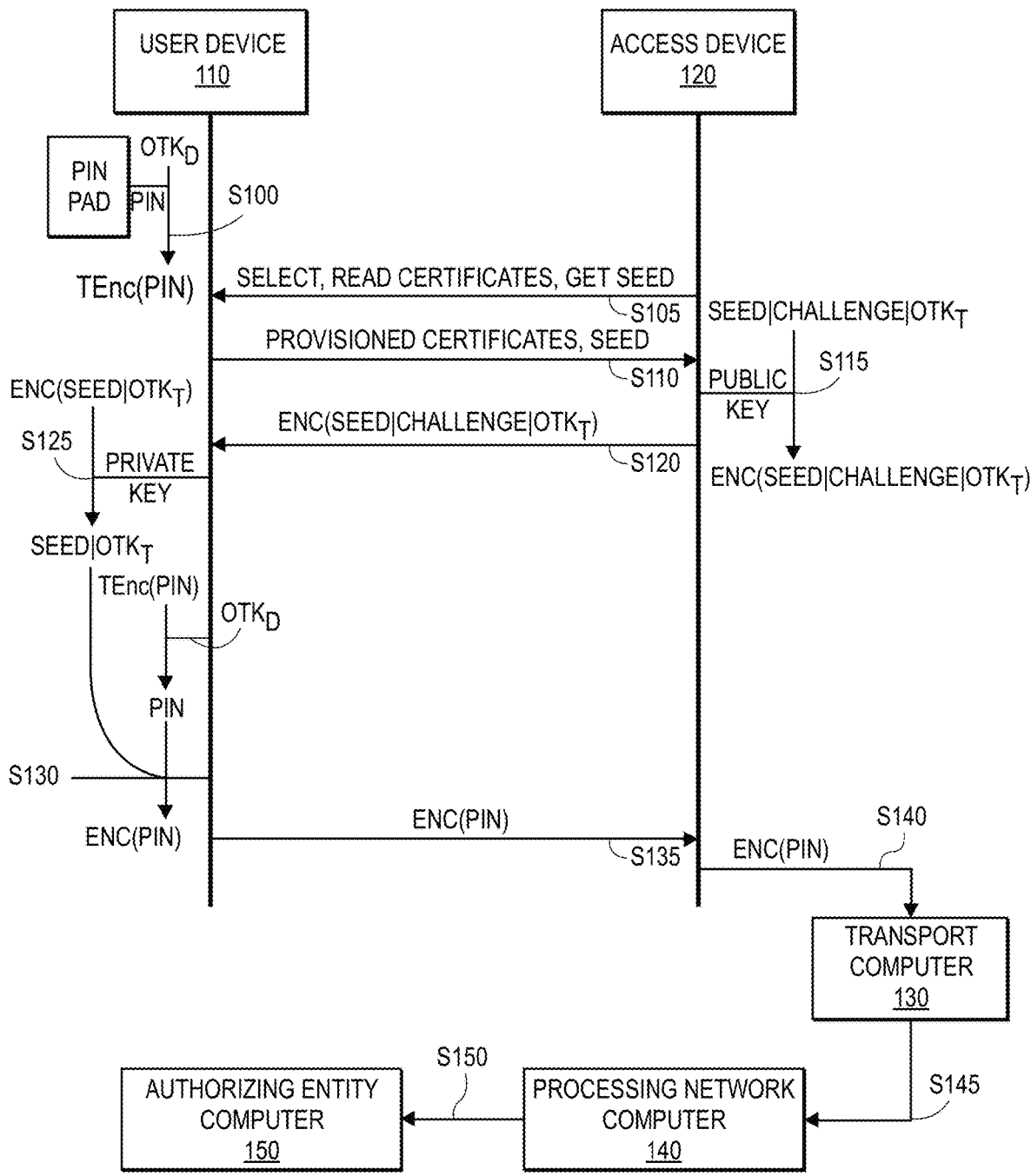
FIG. 1 shows a system and method for entering a secret into an access device according to a first embodiment.

Prior to discussing the details of some embodiments of the present invention, description of some terms may be useful in understanding the various embodiments.

A "user" may include an individual or a computational device. In some embodiments, a user may be associated with one or more personal accounts and/or mobile devices. In some embodiments, the user may be a cardholder, account holder, or consumer.

A "user device" may be any suitable device that a user can interact with (e.g., a payment card or mobile phone). User devices may be in any suitable form. Some examples of user devices include cards (e.g., payment cards such as credit, debit, or prepaid cards) with magnetic stripes or contactless elements (e.g., including contactless chips and antennas), cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g., when a device has remote access to a network by tethering to another device—i.e. using the other device as a modem—both devices taken together may be considered a single mobile device).

A "contactless" communication may be a communication in which data is exchanged between two devices without the need for the devices to be physically coupled. Without limiting the generality of the foregoing, "contactless" communication can include data transmissions by near-field communication (NFC) transceiver, laser, radio frequency, infrared communications, or other radio frequency or wireless communication protocols such as Bluetooth, Bluetooth Low Energy (BLE), Wi-FI, iBeacon, etc.

An "application" may be a computer program that is used for a specific purpose. Examples of applications may include transit applications, secure data access applications, banking applications, digital wallet applications, event ticketing applications, loyalty rewards applications, etc. In some embodiments, an application may be associated with an account of the user maintained by a resource or service provider (e.g., a bank account, a mass transit prepaid account, a building access account, etc.).

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

"Access data" may include any suitable data that can be used to access a resource or create data that can access a resource. In some embodiments, access data may be account information for a payment account. Account information may include a PAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

"Authentication data" may include any data suitable for authenticating a user or mobile device. Authentication data may be obtained from a user or a device that is operated by the user. Examples of authentication data obtained from a user may include secrets such as PINs (personal identification numbers), biometric data, passwords, etc. Examples of authentication data that may be obtained from a device may be include device serial numbers, hardware secure element identifiers, device fingerprints, phone numbers, IMEI numbers, etc.

A "secret" can be information that is not known or unseen by others. A secret may only be known to a user. For example, a PIN, password, biometric sample biometric template, or other data specific to and/or only known to a user may be a secret. A derivative of a secret may be information that is derived from the secret. For example, an encrypted secret or a secret that is concatenated with other information may be derivatives of a secret.

A "key" or a "cryptographic key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

An "access device key" may be a cryptographic key that is used by an access device in an interaction.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

In embodiments of the invention, a user can enter their PIN or other secret into a user device operated by the user. The user device can receive a one-time online PIN encryption key over a contactless connection from an access device. The contactless connection can use a contactless protocol such as NFC/ISO14443, Bluetooth, Wi-Fi direct, etc.). The access device can be a POS terminal with a PIN pad or any other suitable device. The user device can encrypt the PIN entered by the user, and the user device can send the encrypted PIN to the access device over the contactless connection.

In embodiments of the invention, a user can first download and install an application with secret entry capability (e.g., a PIN pad) on their user device. The application may be a stand-alone application such as a building access application, a digital wallet application, a password management application, a banking application, etc. In embodiments wherein the application is used to conduct a financial transaction, after the financial application is installed on the user device, the user can then add one or more payment cards or instruments to the financial application. The application can also be provisioned with one or more digital certificates corresponding to the application, and one or more asymmetric key pairs (e.g., public and private key pairs) associated with the one or more digital certificates. These one or more digital certificates may be provided by the application provider, or by entities (e.g., an authorizing entity or a payment processing network) associated with the selected payment instruments or cards. The one or more digital certificates may each include a public key of a public-private key pair.

FIG. 1 illustrates a user device 110 interacting with an access device 120 during an interaction such as a transaction. The user of the user device 110 needs to interact with the access device 110 to obtain a desired resource (e.g., access to a location, or a good or service). The user device 110 and the access device 120 may be in short-range contactless communication with each other. The access device 120 may be in communication with the authorizing entity computer 150 via the transport computer 130 and the processing network computer 140.

The components in the system in FIG. 1 (as well as FIGS. 2 and 3) can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); and Secure Hypertext Transfer Protocol (HTTPS).

In embodiments of the invention, the user may then start the interaction by selecting an access application (e.g., a payment application) on the user device 110. After selecting the access application, the user may select a credential (e.g., an account number) in the access application. In some cases, the access application may require that the user provide some authentication data such as a biometric to it, before it is allowed to launch or before the user is allowed to access its contents.

The user can then tap the user device 110 against the access device 120. The user device 110 can then receive a request for a secret (e.g., a PIN or personal identification number) from the access device 120. In response to receiving the request for the secret, the user device 110 can then display or sound a prompt for the user to enter a secret such as a PIN (or password) into the access application on the user device 110. In some embodiments, a data entry device such as a PIN pad may be displayed on the display of the user device 110 if the user device 110 does not already have a hardware based data entry device such as keyboard or keypad. The user can then enter the user's secret into the data entry device.

In step S100, the user enters a secret such as a PIN into a data entry device such as a PIN pad displayed on the user device 110. The entered PIN is encrypted by the user device 110 using a one-time use device key, $OTK_D$, to produce an encrypted PIN (or encrypted secret), $T_{Enc}$ (PIN). The encrypted PIN, $T_{Enc}$ (PIN), is then stored in a memory such as secure volatile memory in the user device 110. The one-time use device key, $OTK_D$, can be generated by the access application (or other software) on the user device 110 for every transaction. In some embodiments, a random number generator in the user device 110 can be used by a processor in the user device 110 as an input to produce the one-time use device key, $OTK_D$. The entered secret, the one-time use device key ($OTK_D$) generation, and the secure volatile memory storage may be protected using any suitable secure technology (e.g., Arm TrustZone, Trusted Execution Environment, Trusted UI, Secure Enclave, etc.).

After the user has entered the PIN into the user device 110 and the user device 110 has encrypted the PIN to form the encrypted PIN, $T_{Enc}$ (PIN), the user taps the user device 110 against the access device 120. In step S105, the access device 120 will then send a communication to the user device 110 to request a digital certificate and a seed from the user device 110. The seed can be a random value such as a random number.

In step S110, the user device 110 can generate the seed or may retrieve the seed from memory if the seed was previously generated. The user device 100 can then send the seed and the digital certificate for the access application to the access device 120. After receiving the digital certificate and the seed, the access device 120 can then read and verify the digital certificate (e.g., with a certificate authority) to ensure that the access application is trusted. The access device 120 can then retrieve the public key in the digital certificate.

In some embodiments, the user device 110 may also send a credential such as a PAN or token from the user device 120 to the access device 120 in step S110 or in some other transmission from the user device 110 to the access device 120.

In step S115, after verifying the digital certificate, the access device 120 generates a challenge value (e.g., a random value such as a random number). The access device 120 then uses the public key retrieved from the digital certificate to encrypt a one-time use access device key, $OTK_T$, that is produced by the access device 120 together with the seed and the challenge value (e.g., concatenated together) to produce encrypted data (e.g., shown as ENC (SEED|CHALLENGE|$OTK_T$) in FIG. 1). The one-time use access device key may be a first access device key. The one-time use device key, $OTK_T$ can be a cryptographic key such as a symmetric key or a public key of a public-private key pair.

In step S120, the access device 120 sends the encrypted data (e.g., ENC (SEED|CHALLENGE|$OTK_T$)) including the one-time use access device key, $OTK_T$, to the user device 110 over the contactless connection. The access device 120 may also optionally send transaction information including a transaction amount, an access device identifier, and the transaction currency for the current interaction along with the encrypted data in some embodiments. The user device 110 may then display the received transaction information to the user in some embodiments, so that the user is aware of the details of the current interaction.

In step S125, after receiving the encrypted data (e.g., ENC (SEED|CHALLENGE|$OTK_T$), the user device 110 can decrypt the encrypted data using the private key corresponding to the public key included in the digital certificate. The user device 110 can then recover the seed, the challenge, and the one-time use device key, $OTK_T$. The user device 110 can verify the seed by confirming that it is the same seed that was generated by the user device 110 in step S110. The challenge can be ignored by the user device 110, as it can be used to add randomness to the $OTK_T$.

In step S130, if the seed is verified by the user device 110, the user device 110 can decrypt the encrypted PIN, $T_{Enc}$ (PIN), and then re-encrypt the PIN using the using the one-time use access device key, $OTK_T$ to form encrypted data, ENC (PIN).

In step S135, the user device 110 sends the encrypted data, ENC (PIN), to the access device 120 through the contactless connection.

In step S140, the access device 120 is now in possession of the encrypted data, ENC (PIN) and may then generate and transmit an authorization request message comprising the encrypted data ENC (PIN), a credential of the user, and the transaction amount to the authorizing entity computer 150 (e.g., an issuer computer operated by an issuer of the account being used to conduct the current interaction) via the transport computer 130 (e.g., an acquirer computer operated by an acquirer) and the processing network computer 140 in steps S140, S145, and S150. Other data such as card payment data such as an application cryptogram, an application transaction counter, etc. can be captured from the user device 110 (e.g., prior to the user entering a PIN in the user device 110) by the access device 120 and this data may also be included in the authorization request message.

Any of the downstream entities such as the transport computer 130, the processing network computer 140, or the authorizing entity computer 150 can decrypt the encrypted data, ENC (PIN), using a key corresponding to the one-time access device key, $OTK_T$. In addition to the access device 120, the one-time access device key, $OTK_T$, may also be shared with any of the transport computer 130, the processing network computer 140, or the authorizing entity computer 150. The key used to decrypt the encrypted data may be a symmetric key or a private key corresponding to the one-time access device key, $OTK_T$, that was sent to the user device 120 in step S120.

After receiving the authorization request message, the authorizing entity computer 150 may authorize or decline the authorization request message and may send an authorization response message back to the access device 120 via the processing network computer 140 and the transport computer 130. Part of the authorization process may involve verifying that the PIN that was entered by the user into the user device 110 is in fact the legitiate PIN of the user (which was known to the authorizing entity computer 150).

In some embodiments, the processing network computer 140 may be in a payment processing network, which may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

At the end of the day or at a later time, a clearing and settlement process between the processing network computer 140, the transport computer 130, and the authorizing entity computer 150 can take place.

In some embodiments, to provide greater protection for the PIN (or other secret), the PIN is encrypted before it is encrypted by the one-time use access device key, $OTK_T$. For example, the PIN can be encrypted after it is entered into the PIN pad on the user device 110 or just before it is encrypted with the one-time use access device key, $OTK_T$. In some cases, it may be encrypted with a DUKPT (derived unique key per transaction) key. A DUKPT key is a symmetric key that is derived by the user device using certain information known only to the user device 110 and a downstream entity such as the authorizing entity computer 150. In this example, the PIN is doubly encrypted as it passes from the user device 110 to the access device 120 (i.e., once with the DUKPT key and once with the one-time use access device key, $OTK_T$). The PIN can therefore be protected throughout the process, and PIN can be decrypted once by the access device, and again by a downstream entity such as the authorizing entity computer 150. This advantageously does not alter existing PIN protection schemes that use DUKPT.

The above embodiment provides for a number of advantages. For example, the embodiments describe above do not change the current common PIN encryption scheme, so it has no impact to the entities that operate the transport computer 130, the processing network computer 140, and the authorizing entity computer 150. Further, the PIN can be securely entered into the user's own user device 110 instead of the access device 120. This provides greater security since it is protected during transmission from the user device 110 to the access device 120. It also does not require the user to touch or physically interact with the access device 120, thus reducing the likelihood of the user spreading or contracting pathogens from the access device 120.

Another embodiment of the invention can be described with reference to FIG. 2. Instead of the access device decrypting the encrypted PIN as in the embodiment of FIG. 1, in the embodiment in FIG. 2, a processing computer 230 can perform the decryption of the encrypted PIN. This can provide an additional layer of security over the embodiment in FIG. 1, since a centralized, secure processing computer 230 may decrypt the PIN instead of an access device operated by a resource provider.

There are many access devices in any transaction system. It may be difficult to distribute and maintain the security software associated with each of the many access devices that are present in the transaction system.

Figure 2:
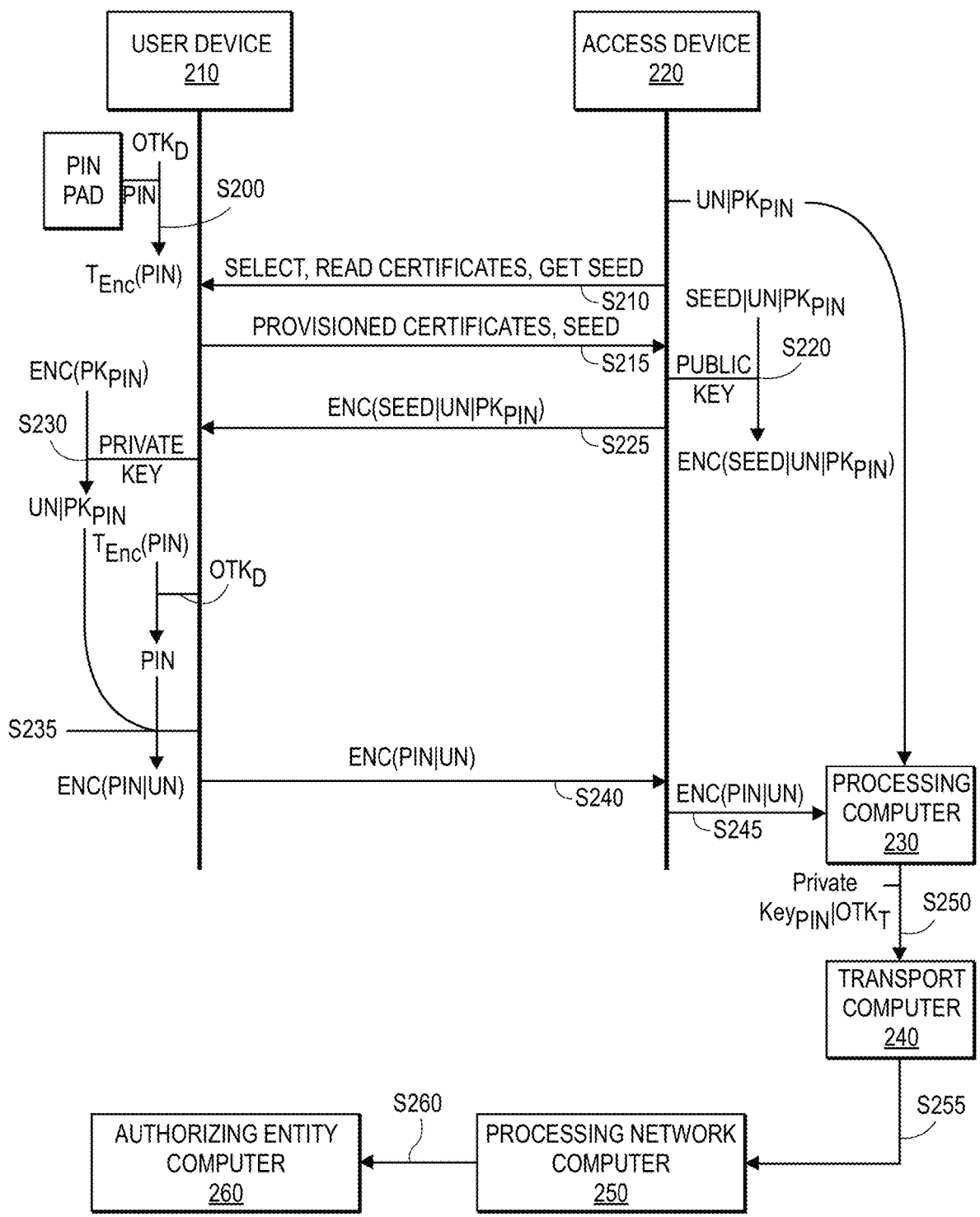
FIG. 2 shows a system and method for entering a secret into an access device according to another embodiment.

FIG. 2 illustrates a user device 210 interacting with an access device 220. The user of the user device 210 needs to interact with the access device 220 to obtain a desired resource (e.g., access to a location, or a good or service). The user device 210 and the access device 220 may be in short-range contactless communication with each other. In addition to the transport computer 240, processing network computer 250, and the authorizing entity computer 260 which are described above with respect to FIG. 1, FIG. 2 also shows a processing computer 230. The processing computer 230 may be part of or in communication with any of the transport computer 240, processing network computer 250, and the authorizing entity computer 260. It may alternatively be operated by an entirely separate entity.

As in the embodiment in FIG. 1, the user can then tap the user device 210 against the access device 220. The user device 210 can then receive a request for a secret from the access device 220. The user device 210 can then display or sound prompt for the user to enter a secret such as a PIN into the access application on the user device 210. In some embodiments, a PIN pad may be displayed on the display of the user device 210, and the user can enter the user's PIN into the PIN pad.

In step S200, the user enters a secret (e.g., a PIN) into the PIN pad displayed on the user device 210. The entered PIN is encrypted by the user device 210 using a one-time use device key, $OTK_D$, to produce an encrypted PIN (or encrypted secret), $T_{Enc}$ (PIN). The encrypted PIN is then stored in a secure volatile memory in the user device. In some embodiments, the one-time use device key, $OTK_D$, can be generated by the access application on the user device 210 for every transaction. In some embodiments, a random number generator in the user device 210 can be used by a processor in the user device 210 as an input to produce the one-time use device key, $OTK_D$. As noted above, the PIN entry and storage process, the $OTK_D$ generation process, and temporary/volatile storage of data in the user device 210 may be protected by any suitable secure technology.

In step S205, before or after the user device 210 starts communicating with the access device 220, the access device 220 requests an unpredictable number, UN, and a PIN public key, $PK_{PIN}$, from the processing computer 230. In some embodiments, the access device 220 may have an API that allows the processing computer 230 to communicate with the access device 220. The PIN public key, $PK_{PIN}$, may be an example of first access device key.

After the user enters the PIN into the user device 210 and the user device 210 has produced the encrypted PIN, $T_{Enc}$ (PIN), the user taps the user device 210 against the access device 220. In step S210, the access device 220 then sends a communication to the user device 210 to request a digital certificate associated with the access application being used to conduct the current interaction, and a seed from the user device 210. The seed can be a random value such as a random number.

In step S215, the user device 210 can generate the seed or may retrieve the seed from memory if the seed was previously generated. The user device 210 then transmits the seed and the digital certificate to the access device 220. The access device 220 will then read and verify the digital certificate (e.g., with a certificate authority). The access device 220 can then retrieve the public key in the digital certificate.

In some embodiments, the user device 210 may also send a credential such as a PAN or token from the user device 210 to the access device 220 in step S215 or in some other transmission from the user device 210 to the access device 220.

In step S220, the access device 220 then uses the public key retrieved from the digital certificate to encrypt the seed, the unpredictable number, UN, and the PIN public key, $PK_{PIN}$, to produce encrypted data (e.g., ENC (SEED|UN|$PK_{PIN}$).

In step S225, the access device 220 sends the encrypted data (e.g., ENC (SEED|UN|$PK_{PIN}$) including the PIN public key, $PK_{PIN}$, to the user device 210 over the contactless connection. In some embodiments, the access device 220 may also send transaction information including an access device identifier, a transaction amount and the transaction currency along with the encrypted data. The user device 210 may then display the received transaction information to the user to inform the user of the details of the current interaction.

In step S230, after receiving the encrypted data (e.g., ENC (SEED|UN|PK$_{PIN}$), the user device 210 can decrypt it using the private key corresponding to the public key included in the digital certificate. The user device 210 can then recover the seed, the challenge, and the one-time use device key, OTK$_T$. The one-time use device key, OTK$_T$, can be a symmetric key or a public key of a public-private key pair. The user device 210 can verify the seed by confirming that it is the same seed that was generated by the user device 210 in step S210.

In step S235, if the seed is verified, the user device 210 can decrypt the encrypted PIN, T$_{Enc}$ (PIN) with the one-time use device key, OTK$_D$. The user device 210 can then concatenate the PIN and the unpredictable number, UN, and can then encrypt the PIN and the unpredictable number, UN, using the using the PIN public key, PK$_{PIN}$, received from the access device 220 to produce encrypted data, ENC (PIN|UN).

In step S240, the user device 210 sends the encrypted data, ENC (PIN|UN), which includes the encoded PIN to the access device 220 through the contactless connection.

In step S245, the access device 220 generates an authorization request message comprising the credentials from the user device, a transaction amount, and the encrypted data (e.g., ENC (PIN|UN)).

In step S250, the processing computer 230 receives the authorization request message, extracts the encrypted data (e.g., ENC (PIN|UN)), and decrypts it using the PIN private key, Private Key$_{PIN}$, thereby recovering the encrypted PIN and the unpredictable number, UN. The PIN private key, Private Key$_{PIN}$, may be an example of second access device key. The processing computer 230 checks to see if the unpredictable number, UN, is the same as the unpredictable number, UN, sent in step S205. If it is, then the processing computer 230 may then encrypt the PIN using a one-time symmetric key (e.g., a DUKPT key). The processing computer 230 then modifies the authorization request message or generates a new authorization request message including the encrypted PIN, a credential of the user (e.g., a PAN or token), and the transaction amount, and sends it to the authorizing entity computer 260 via the transport computer 240 and the processing network computer 250 in steps S250, S255, and S260. The authorizing entity computer 260 may authorize or decline the authorization request message and may send an authorization response message back to the access device 220 via the processing network computer 250, the transport computer 240, and the processing computer 230. As in the method in FIG. 1, a clearing and settlement process between the processing network computer 250, the transport computer 240, and the authorizing entity computer 150 may be performed at a later time.

In the embodiments above, although the processing computer 230 uses a private key, Private Key$_{PIN}$, and a PIN public key, PK$_{PIN}$ to protect the PIN in this embodiment, in other embodiments, these keys may be symmetric keys instead of asymmetric keys.

The embodiment in FIG. 2 provides security for the PIN, since an attacker that compromises the access device 220 will be unable to obtain the PIN. That is, in addition to the advantages that are present in the embodiment in FIG. 1, the processing computer 230 can centralize the security of the decryption of the encrypted data including the PIN, thus making it more difficult for attackers to obtain the PIN (or other secret).

Figure 3:
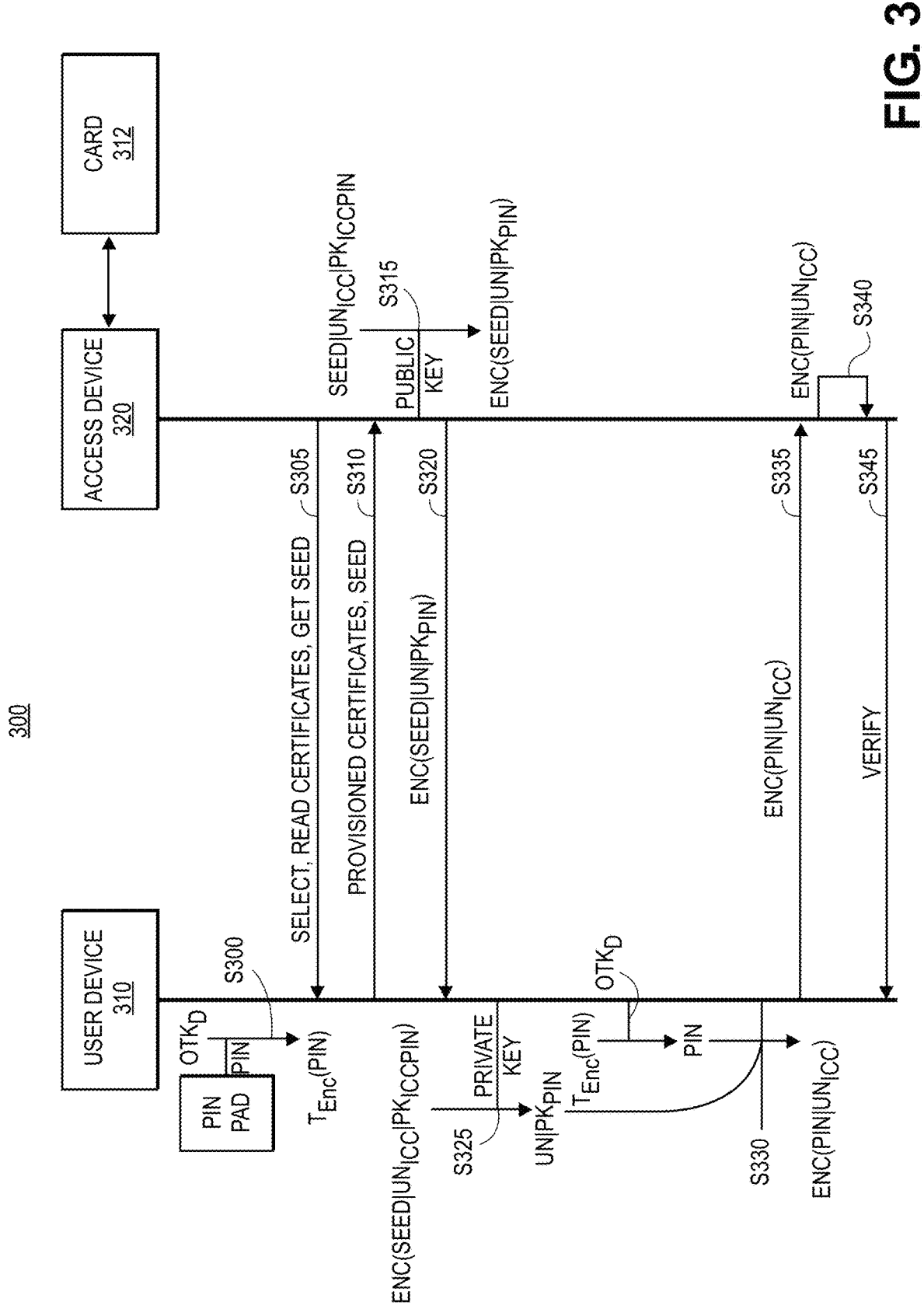
FIG. 3 shows a system and method for entering a secret into an access device according to another embodiment.

Another embodiment can be described with respect to FIG. 3. The embodiment in FIG. 3 includes the use of an offline secret verification process that can involve the use of a card (or other portable device) in addition to a user device. Both the card and the user device may interact with an access device to conduct an interaction.

As in the embodiments in FIGS. 1 and 2, a user can first download and install an access application with secret entry capability on their device, and a corresponding digital certificate.

When conducting an interaction, the user may cause a portable device such as a card 312 to communicate with an access device 320. For example, the user can insert a card (e.g., a credit or debit card, or access card) 310 or other portable device into a slot with a card reader in the access device 320. The insertion of the card 312 into the access device can then cause the access device 320 to prompt the user to cause the user device 310 to interact with the access device 320. The user device 310 can then be brought into proximity with the access device 320. This communication with the user device 310 can cause it to display or sound a prompt for the user to enter a secret such as a PIN into the access application on the user device 310. In some embodiments, a PIN pad may be displayed on the display of the user device 310, and the user can enter the user's PIN into the PIN pad.

Now referring to FIG. 3, in step S300, the user enters a secret (e.g., a PIN) into the PIN pad displayed on the user device 310. The entered PIN is encrypted by the user device 310 using a one-time use device key, OTK$_D$, to produce an encrypted PIN (or encrypted secret), T$_{Enc}$ (PIN). The encrypted PIN is then stored in a secure volatile memory in the user device 310. In some embodiments, the one-time use device key, OTK$_D$, can be generated by the application on the user device 310 for every transaction. In some embodiments, a random number generator in the user device 310 can be used to produce the one-time use device key.

In step S305, the user taps the user device 310 against the access device 320. The access device 320 will then request the digital certificate and a seed (e.g., a random number generated by the user device 310) from the user device 310.

In step S310, the user device 310 generates the seed and then sends the seed and the digital certificate to the access device 320. The access device 320 can then read and verify the digital certificate. The access device 320 can then retrieve an ICC unpredictable number (UN$_{ICC}$) and a card certificate (or other portable device certificate) from the card 312 that is inserted in the access device 320 using a command such as a GET CHALLENGE command. The access device 320 then verifies the card certificate, which contains an ICC PIN public key, using a command such as a READ RECORD command. The ICC PIN public kay may be an example of a first access device key.

In some embodiments, the user device 310 or the card 312 may also send a credential such as a PAN or token from the user device 310 or the card 312 to the access device 320 in step S310 or in some other transmission from the user device 310 or the card 312 to the access device 320.

In step S315, the access device 320 uses the public key retrieved from the application certificate to encrypt the ICC PIN public key, the seed, and the ICC unpredictable number (all shown in FIG. 3 as being concatenated together) to form encrypted data.

In step S320, the access device 320 sends the encrypted data to the user device 310 over the contactless connection. The access device 320 may optionally include the transaction amount and transaction currency together with the encrypted data. The user device 310 may then display the received transaction information to the user as a notification.

In step S325, the user device 310 will receive the encrypted data and decrypt it using the private key corresponding to the public key included in the digital certificate to obtain the ICC PIN public key, $PK_{ICCPIN}$, the seed, and the ICC unpredictable number. The user device 310 can verify the seed by confirming that it is the same seed that was generated by the device in step S310.

In step S330, if the seed verification passes, the user device 310 will decrypt the PIN entered by the user using the one-time use device key, $OTK_D$, and then encrypt the PIN and the ICC unpredictable number using the ICC PIN key, $PK_{ICCPIN}$, to form encrypted data (e.g., ENC (PIN|$UN_{ICC}$)).

In step S335, the user device 310 sends the encrypted data to the access device 320 through the contactless connection.

In step S340, after receiving the encrypted data from the user device 310, the access device 320 sends the received encrypted data to the inserted card 312.

In step S345, the card 312 decrypts the encrypted data using a ICC PIN private key stored in the card 312 to recover the PIN and the ICC unpredictable number. The ICC PIN private key may be an example of a second access device key. The card 312 verifies the ICC unpredictable number by confirming that it is the same number that was previously generated by the card in step S310. The card 312 may then verify that the PIN entered by the user into the user device 310 is the same PIN that is stored in the card 312.

Once the access device 320 receives a confirmation that the card 312 has verified the PIN, the access device 320 may store the verification along with the credential obtained from the user device 310 or the card 312, and may later generate an authorization request message and submit it for authorization, and also perform a clearing and settlement process (as described above with respect to FIGS. 1 and 2).

The embodiments described with respect to FIG. 3 can be used in offline settings, where the access device 320 is not in communication with any external server computer.

Figure 4:
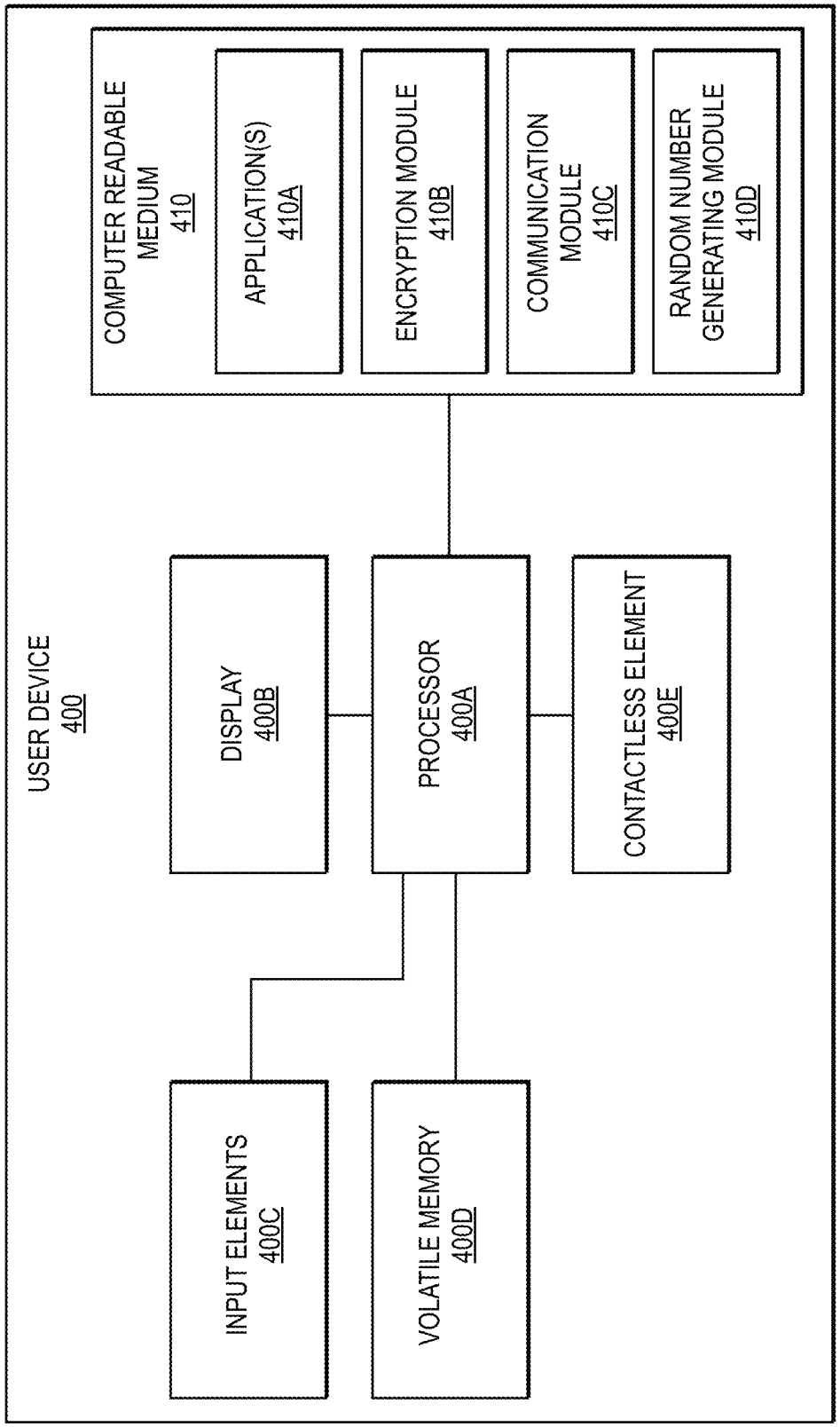
FIG. 4 shows a block diagram of a user device according to an embodiment.

FIG. 4 shows a block diagram of a user device 400 according to embodiments.

The user device 400 may include a processor 400A for processing functions of user device 400. The user device 400 may also include a display 400B and input elements 400C (e.g., a touchscreen, keyboard, biometric sensors, etc.) coupled to the processor 400A. The user device 400 may further comprise a volatile memory 400D (e.g., RAM, DRAM, EEPROM, etc.), a non-transitory computer readable medium 410, and a contactless element 400E, coupled to the processor 400A.

The processor 400A may comprise any suitable data computation device or devices. Processor 400A may be able to interpret code and carry out instructions stored on computer readable medium 410. Processor 400A may comprise a Central Processing Unit (CPU) operating on a reduced instructional set, and may comprise a single or multi-core processor. Processor 400A may also include an Arithmetic Logic Unit (ALU) and a cache memory.

In some embodiments, the contactless element 400E may be implemented in the form of a semiconductor chip (or other data storage element) with an associated wireless transfer (e.g., data transmission) element, such as an antenna. Contactless element 400E may be capable of transferring and receiving data using a short-range wireless communication capability (e.g., NFC).

The computer readable medium 410 may contain code, executable by the processor, for implementing the methods of embodiments. For example, the computer readable medium 410 may comprise code executable by the processor 400A for implementing a method comprising: transmitting, by a user device to an access device, a digital certificate and a seed, wherein the access device encrypts the seed, and a first access device key with a public key from the digital certificate to form encrypted data; receiving, by the user device from the access device, the encrypted data; decrypting, by the user device, the encrypted data using a private key corresponding to the public key to obtain the seed, and the first access device key; verifying, by the user device, that the seed received from the access device matches the seed sent to the access device; encrypting, by the user device, a secret or derivative thereof with the first access device key to form an encrypted secret or derivative thereof; and transmitting, by the user device to the access device, the encrypted secret or derivative thereof.

The computer readable medium 410 may contain one or more access applications 410A (e.g., digital wallet application, mobile banking application maintained by an authorizing entity or payment processing network). Computer readable medium 410 may further contain a number of functional modules including an encryption module 410B, a communication module 410C, and a random number generating module 410C.

The encryption module 410B can include code, executable by processor 400A for performing cryptographic services, including encrypting or decrypting data (such as generating authorization response cryptograms), digitally signing data (such as commitment transactions), performing key exchanges, encrypting messages sent to other systems or devices, and the like.

The communication module 410C can include code, executable by the processor 400A to allow the user device 400 to communication with other external devices.

The random number generating module 410D may include code, executable by the processor 400A to generate random numbers such as the above-described seeds.

Figure 5:
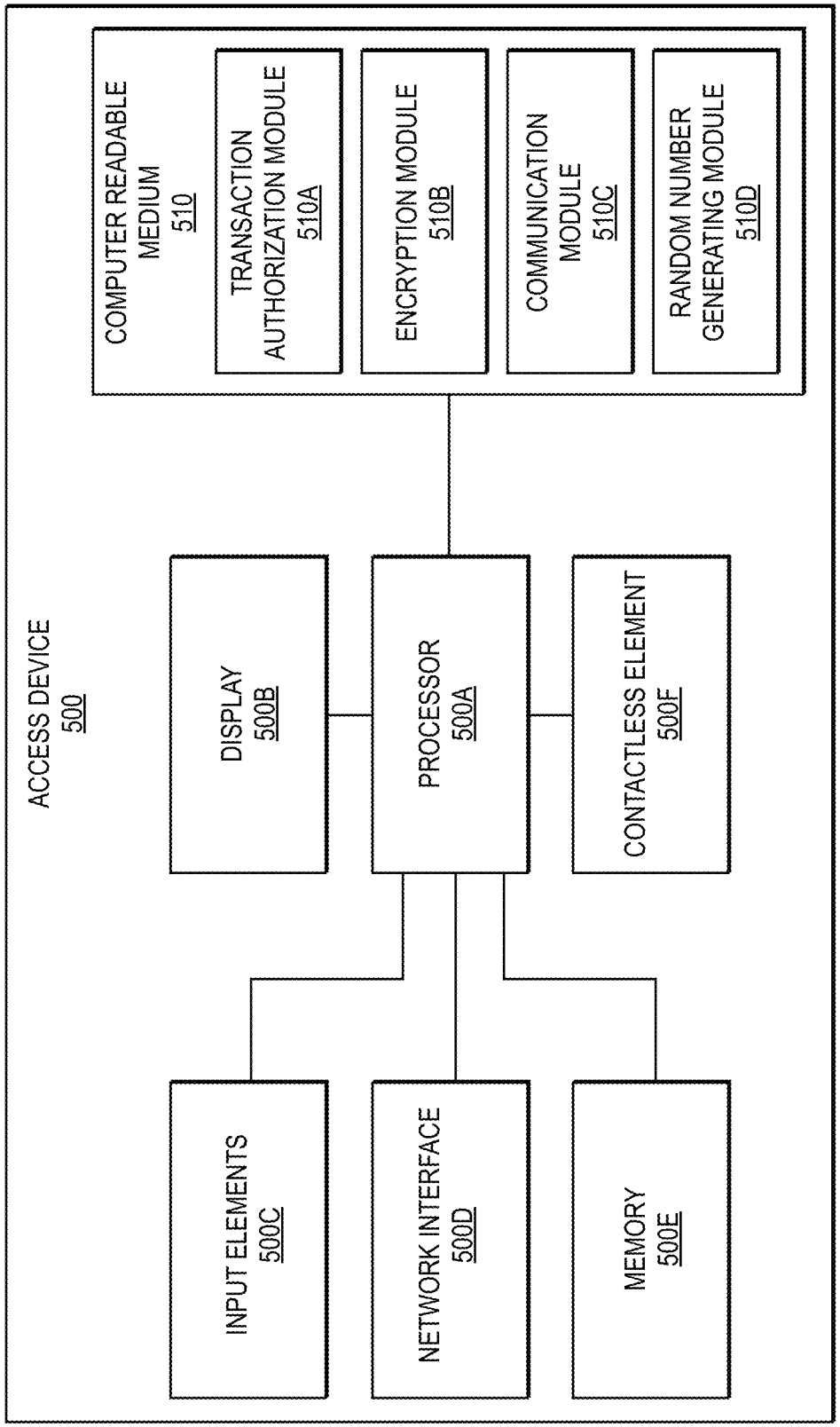
FIG. 5 shows a block diagram of an access device according to an embodiment.

FIG. 5 shows a block diagram of an access device 500 according to embodiments.

The access device 500 includes a processor 500A. The access device may also include a display 500B and input elements 500C (e.g., a touchscreen, PIN pad, microphone, portable device reader, etc.) coupled to the processor 500A. The access device 500 may further comprise a network interface 500D, a memory 500E, a contactless element 500F, and a computer readable medium 510 coupled to the processor. The contactless element 500F is configured to communicate with (e.g., send and/or received data) the contactless element 400E of the user device 400 using a short-range wireless communication capability (e.g., NFC).

The network interface 500D may include an interface that can allow the access device 500 to communicate with external devices (e.g., a user device, a processing computer, an acquirer computer).

The computer readable medium 510 may contain a number of modules to perform methods of embodiments including a transaction authorization module 510A, an encryption module 510B, a communication module 510C, and a random number generator module 510D.

The transaction authorization module 510A may comprise code, executable by the processor 500A to perform transaction authorization functions. Such functions may include generating authorization request message and receiving authorization response messages.

The encryption module 510B, the communication module 510C, and the random number generator module 510D can be similar to the encryption module 410B, the communication module 410C, and the random number generating module 410D in FIG. 4 and the descriptions thereof need not be repeated here.

Figure 6:
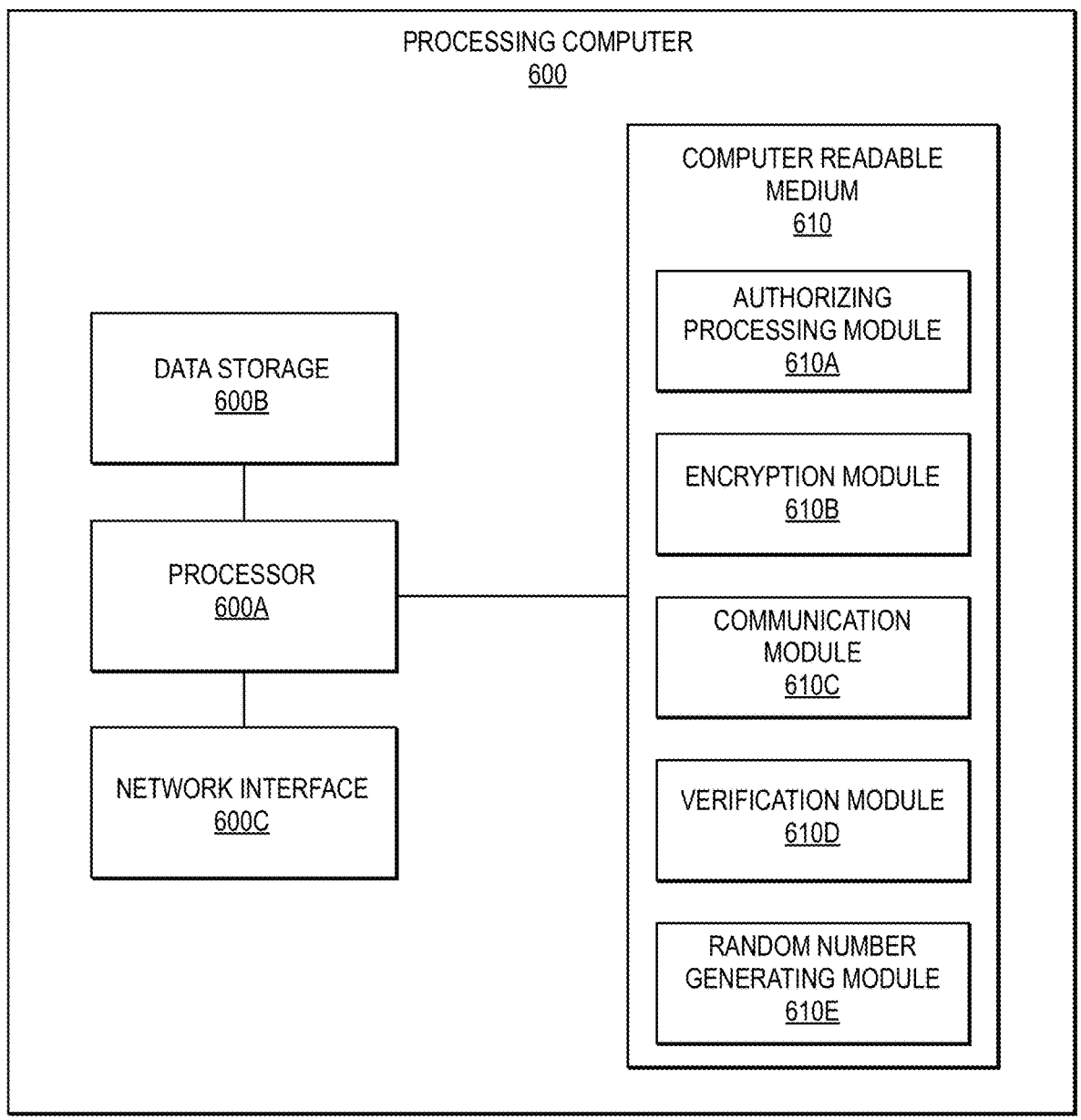
FIG. 6 shows a block diagram of a processing computer according to an embodiment.

FIG. 6 shows a block diagram of a processing computer 600 according to embodiments.

The processing computer 600 includes a processor 600A for processing the functions of the processing computer 600. The processing computer 600 may also include a data storage 600B, coupled to the processor 600A. The processing computer 600 may further comprise a network interface 600C that may include an interface that can allow the processing computer 600 to communicate with external devices (e.g., an access device, an acquirer computer), and which may be coupled to the processor 600A. The processing computer 600 may further comprise a computer readable medium 610, which is coupled to the processor.

The computer readable medium 610 may contain a number of software modules. The modules may include an authorization processing module 610A, an encryption module 610B, a communication module 610C, a verification module 610D, and a random number generating module 610E.

The authorization processing module 610A may comprise code, executable by the processor 600A, to generate and process authorization request and response message.

The encryption module 610B may comprise functions or code similar to the encryption module 510B described above in FIG. 5.

The communication module 610C may comprise code, executable by the processor 600A, to allow the processing computer 600 to communicate with other external entities.

The verification module 610D may comprise code, executable by the processor 600A, to perform any of the above described verification processes, including verification of digital certificates, and the like.

The random number generating module 610E may comprise code, executable by the processor 600A, to generate a random value that can be used in the above described processes.

The embodiments described above have a number of technical advantages. For example, embodiments of the invention can allow a user to conduct a transaction without entering a secret into an access device. The secret may be entered into the user's own user device. Further, the secret can be protected during the message exchange process with the access device, and the process is compatible with existing transaction processing systems and methods.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in entirety for all purposes. None is admitted to be prior art.

What is claimed is:

1. An access device comprising:
   a processor; and
   a non-transitory computer readable medium, the non-transitory computer readable medium comprising code, executable by the processor, for performing a method comprising:
   receiving, from a user device, a digital certificate and a seed;
   encrypting the seed, and a first access device key with a public key from the digital certificate to form encrypted data;
   transmitting, to the user device, the encrypted data, wherein the user device decrypts the encrypted data using a private key corresponding to the public key to obtain the seed, and the first access device key, verifies that the seed received from the access device matches the seed sent to the access device, and encrypts a secret or derivative thereof with the first access device key to form an encrypted secret or derivative thereof; and
   receiving, from the user device, the encrypted secret or derivative thereof.

2. The access device of claim 1, wherein the method further comprises:
   decrypting the encrypted secret or derivative thereof with a second access device key corresponding to the first access device key to obtain the secret or derivative thereof.

3. The access device of claim 2, wherein the access device is a POS terminal.

4. The access device of claim 3, wherein the method further comprises:
   transmitting to the user device a request for the seed and the digital certificate.

5. The access device of claim 2, wherein the secret or derivative thereof includes a personal identification number.

6. The access device of claim 2, wherein the method further comprises:
   generating an authorization request message including the secret or derivative thereof.

7. The access device of claim 2, wherein the secret or derivative thereof comprises the secret.

8. The access device of claim 1, wherein, in the method, the access device and the user device communicate with each other through a short-range wireless communication medium.

9. The access device of claim 1, wherein in the method, the access device and the user device communicate with each other through NFC.

10. The access device of claim 1, wherein the first access device key is a symmetric key.

11. The access device of claim 1, wherein the method further comprises:
receiving, from a processing computer, the first access device key.

12. The access device of claim 1, wherein the method further comprises:
receiving the first access device key from a portable device.

13. The access device of claim 12, wherein the portable device is a card.

14. The access device of claim 1, wherein the method further comprises:
verifying the digital certificate with a certificate authority.

15. The access device of claim 1, wherein the seed is a random value.

16. The access device of claim 1, wherein the method further comprises:
decrypting the encrypted secret or derivative thereof with a second access device key corresponding to the first access device key to obtain the secret or derivative thereof; and
generating an authorization request message including the secret or derivative thereof.

17. The access device of claim 16, wherein the secret or derivative thereof is the secret, wherein the secret is a PIN.

18. A system comprising:
an access device comprising,
a processor, and
a non-transitory computer readable medium, the non-transitory computer readable medium comprising code, executable by the processor, for performing a method comprising,
receiving, from a user device, a digital certificate and a seed,
encrypting the seed, and a first access device key with a public key from the digital certificate to form encrypted data,
transmitting, to the user device, the encrypted data, wherein the user device decrypts the encrypted data using a private key corresponding to the public key to obtain the seed, and the first access device key, verifies that the seed received from the access device matches the seed sent to the access device, and encrypts a secret or derivative thereof with the first access device key to form an encrypted secret or derivative thereof, and
receiving, from the user device, the encrypted secret or derivative thereof; and
the user device.

19. The system of claim 18, further comprising:
a card, wherein the card is programmed to provide the first access device key to the access device.

20. The system of claim 18, further comprising:
a processing computer, wherein the processing computer is programmed to provide the first access device key to the access device.

* * * * *